United States Patent
Wang

(10) Patent No.: US 10,321,326 B2
(45) Date of Patent: Jun. 11, 2019

(54) INFORMATION TRANSMISSION METHOD, DEVICE, AND SYSTEM

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 19 days.

(21) Appl. No.: 15/545,150

(22) PCT Filed: Jan. 20, 2015

(86) PCT No.: PCT/CN2015/071123
§ 371 (c)(1),
(2) Date: Jul. 20, 2017

(87) PCT Pub. No.: WO2016/115683
PCT Pub. Date: Jul. 28, 2016

(65) Prior Publication Data
US 2018/0014202 A1 Jan. 11, 2018

(51) Int. Cl.
*H04W 16/14* (2009.01)
*H04W 16/10* (2009.01)
(Continued)

(52) U.S. Cl.
CPC .......... *H04W 16/14* (2013.01); *H04J 13/10* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2013/0187010 A1 7/2013 Kim
2013/0196674 A1 8/2013 Ahmadi
(Continued)

FOREIGN PATENT DOCUMENTS

CN 101997568 A 3/2011
CN 103213602 A 7/2013
(Continued)

OTHER PUBLICATIONS

"On Listen Before Talk and Channel Access." 3GPP TSG RAN WG1 Meeting #79, R1-145003, San Francisco, USA (Nov. 17-21, 2014).
(Continued)

*Primary Examiner* — Diane L Lo
(74) *Attorney, Agent, or Firm* — Leydig, Voit & Mayer, Ltd.

(57) ABSTRACT

The present disclosure provides an information transmission method, a device, and a system, and relates to the communications field, so as to resolve a prior-art problem that when an unlicensed spectrum is preempted to send data, a receive end cannot obtain a correct time resource sequence number, and cannot descramble information. A first device scrambles, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; and the first device sends scrambled first data to the second device.

14 Claims, 4 Drawing Sheets

(51) Int. Cl.
*H04J 13/10* (2011.01)
*H04L 5/00* (2006.01)
*H04W 72/04* (2009.01)
*H04W 72/12* (2009.01)

(52) U.S. Cl.
CPC ....... *H04W 16/10* (2013.01); *H04W 72/0446* (2013.01); *H04W 72/1263* (2013.01); *H04L 5/0007* (2013.01); *H04L 5/0044* (2013.01); *H04L 5/0098* (2013.01)

(56) References Cited

U.S. PATENT DOCUMENTS

| | | | |
|---|---|---|---|
| 2013/0308555 A1 | 11/2013 | Ho | |
| 2014/0362780 A1* | 12/2014 | Malladi | H04W 16/14 370/329 |
| 2015/0098349 A1* | 4/2015 | Wei | H04W 16/14 370/252 |
| 2015/0282183 A1* | 10/2015 | Sverdlov | H04L 25/03866 370/329 |
| 2016/0073389 A1 | 3/2016 | Kishiyama et al. | |

FOREIGN PATENT DOCUMENTS

| | | |
|---|---|---|
| CN | 103428863 A | 12/2013 |
| EP | 2384074 A1 | 11/2011 |
| EP | 2477345 A2 | 7/2012 |
| JP | 2014204306 A | 10/2014 |
| WO | 2011162660 A1 | 12/2011 |

OTHER PUBLICATIONS

"LBT Enhancements for Licensed-Assisted Access," 3GPP TSG RAN WG1 Meeting #79, R1-144701, San Francisco, USA (Nov. 17-21, 2014).

* cited by examiner

INFORMATION TRANSMISSION METHOD, DEVICE, AND SYSTEM

CROSS-REFERENCE TO RELATED APPLICATIONS

This application is a National Stage of International Application No. PCT/CN2015/071123, filed on Jan. 20, 2015, which is hereby incorporated by reference in its entirety.

TECHNICAL FIELD

The present disclosure relates to the communications field, and in particular, to an information transmission method, a device, and a system.

BACKGROUND

In a wireless communications system, before information is sent, a scrambling sequence is usually used to scramble the information. The scrambling sequence is generated according to a parameter such as a timeslot sequence number (Slot Number) of a timeslot included in the sent information. Generally, information is transmitted by using a data frame as a unit. One data frame includes 10 subframes, and one subframe includes two timeslots. Therefore, there are 20 timeslots in total in one data frame. A transmit end sends data at a timeslot, and a scrambling code sequence generated according to a timeslot sequence number of the timeslot is used to scramble information.

When information is transmitted, if data is transmitted on a licensed carrier, because the licensed carrier is private, a transmitted data frame is continuous, and a timeslot sequence number is also continuous; if data is transmitted on an unlicensed carrier, because the unlicensed carrier is public, the unlicensed carrier needs to be preempted for using, and a moment for preempting the unlicensed carrier is random. Therefore, a sending moment for sending a data frame on the unlicensed carrier is random, and is discontinuous, and a timeslot for sending the data is random. That is, a timeslot sequence number is also random, and a scrambling sequence of information carried on a particular timeslot is also random, so that a receive end cannot descramble the information.

SUMMARY

Embodiments of the present disclosure provide an information transmission method, a device, and a system, so as to resolve a prior-art problem that when an unlicensed spectrum is preempted to send data, a receive end cannot obtain a correct sequence number, and cannot descramble information.

To achieve the foregoing objective, the following technical solutions are used in the embodiments of the present disclosure:

According to a first aspect, an information transmission method is provided, including:

scrambling, by a first device according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; and sending, by the first device, scrambled first data to the second device.

With reference to the first aspect, in a first possible implementation of the first aspect, a time domain resource of the second time resource includes a time domain resource of the first time resource.

With reference to the first possible implementation of the first aspect, in a second possible implementation of the first aspect, the time domain resource of the second time resource is the same as that of the first time resource.

With reference to the first aspect, in a third possible implementation of the first aspect, the first value is a preset value, a value determined by the first device, or a value determined by a third party.

With reference to the third possible implementation of the first aspect, in a fourth possible implementation of the first aspect, the first value is the value determined by the first device, and the method further includes:

sending, by the first device, the first value to the second device.

With reference to any one of the first aspect to the fourth possible implementation of the first aspect, in a fifth possible implementation of the first aspect, the first time resource is a frame, a subframe, or a timeslot; and the second time resource is a frame, a subframe, or a timeslot.

With reference to any one of the first aspect to the fifth possible implementation of the first aspect, in a sixth possible implementation of the first aspect, the first time resource is a first subframe, where the first subframe includes N orthogonal frequency division multiplexing OFDM symbols, the N OFDM symbols are first N OFDM symbols of M OFDM symbols included in one complete subframe, M and N are positive integers, and M≥N.

With reference to any one of the first aspect to the fifth possible implementation of the first aspect, in a seventh possible implementation of the first aspect, the first time resource is a first timeslot, where the first timeslot belongs to a first subframe, and the first subframe includes N OFDM symbols; when N is greater than M/2, the first timeslot includes first N−M/2 OFDM symbols of the N OFDM symbols; M is a quantity of OFDM symbols included in one complete subframe, M and N are positive integers, and M≥N.

According to a second aspect, an information transmission method is provided, including:

receiving, by a second device, scrambled first data sent by a first device; and descrambling, by the second device, the first data according to a first scrambling code sequence, where the first data is carried on a first time resource on an unlicensed carrier, and the first scrambling code sequence is generated according to a sequence number of a second time resource on a licensed carrier or a first value.

With reference to the second aspect, in a first possible implementation of the second aspect, a time domain resource of the second time resource includes a time domain resource of the first time resource.

With reference to the first possible implementation of the second aspect, in a second possible implementation of the second aspect, the time domain resource of the second time resource is the same as that of the first time resource.

With reference to the second aspect, in a third possible implementation of the second aspect, the first value is a preset value, a value determined by the first device, or a value determined by a third party.

With reference to the third possible implementation of the second aspect, in a fourth possible implementation of the second aspect, the first value is the value determined by the first device, and the method further includes:

receiving, by the second device, the first value sent by the first device.

With reference to any one of the second aspect to the fourth possible implementation of the second aspect, in a fifth possible implementation of the second aspect, the first time resource is a frame, a subframe, or a timeslot; and the second time resource is a frame, a subframe, or a timeslot.

With reference to any one of the second aspect to the fifth possible implementation of the second aspect, in a sixth possible implementation of the second aspect, the first time resource is a first subframe, where the first subframe includes N orthogonal frequency division multiplexing OFDM symbols, the N OFDM symbols are first N OFDM symbols of M OFDM symbols included in one complete subframe, M and N are positive integers, and M≥N.

With reference to any one of the second aspect to the fifth possible implementation of the second aspect, in a seventh possible implementation of the second aspect, the first time resource is a first timeslot, where the first timeslot belongs to a first subframe, and the first subframe includes N OFDM symbols; when N is greater than m/2, the first timeslot includes first N−M/2 OFDM symbols of the N OFDM symbols; M is a quantity of OFDM symbols included in one complete subframe, M and N are positive integers, and M≥N.

According to a third aspect, a first device is provided, including:

a scrambling unit, configured to scramble, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; and a sending unit, configured to send first data scrambled by the scrambling unit to the second device.

With reference to the third aspect, in a first possible implementation of the third aspect, a time domain resource of the second time resource includes a time domain resource of the first time resource.

With reference to the first possible implementation of the third aspect, in a second possible implementation of the third aspect, the time domain resource of the second time resource is the same as that of the first time resource.

With reference to the third aspect, in a third possible implementation of the third aspect, the first value is a preset value, a value determined by the first device, or a value determined by a third party.

With reference to the third possible implementation of the third aspect, in a fourth possible implementation of the third aspect, the first value is the value determined by the first device; and the sending unit is further configured to send the first value to the second device.

With reference to any one of the third aspect to the fourth possible implementation of the third aspect, in a fifth possible implementation of the third aspect, the first time resource is a frame, a subframe, or a timeslot; and the second time resource is a frame, a subframe, or a timeslot.

With reference to any one of the third aspect to the fifth possible implementation of the third aspect, in a sixth possible implementation of the third aspect, the first time resource is a first subframe, where the first subframe includes N orthogonal frequency division multiplexing OFDM symbols, the N OFDM symbols are first N OFDM symbols of M OFDM symbols included in one complete subframe, M and N are positive integers, and M≥N.

With reference to any one of the third aspect to the fifth possible implementation of the third aspect, in a seventh possible implementation of the third aspect, the first time resource is a first timeslot, where the first timeslot belongs to a first subframe, and the first subframe includes N OFDM symbols; when N is greater than M/2, the first timeslot includes first N−M/2 OFDM symbols of the N OFDM symbols; M is a quantity of OFDM symbols included in one complete subframe, M and N are positive integers, and M≥N.

According to a fourth aspect, a second device is provided, including:

a receiving unit, configured to receive scrambled first data sent by a first device; and a descrambling unit, configured to descramble, according to a first scrambling code sequence, the first data received by the receiving unit, where the first data is carried on a first time resource on an unlicensed carrier, and the first scrambling code sequence is generated according to a sequence number of a second time resource on a licensed carrier or a first value.

With reference to the fourth aspect, in a first possible implementation of the fourth aspect, a time domain resource of the second time resource includes a time domain resource of the first time resource.

With reference to the first possible implementation of the fourth aspect, in a second possible implementation of the fourth aspect, the time domain resource of the second time resource is the same as that of the first time resource.

With reference to the fourth aspect, in a third possible implementation of the fourth aspect, the first value is a preset value, a value determined by the first device, or a value determined by a third party.

With reference to the third possible implementation of the fourth aspect, in a fourth possible implementation of the fourth aspect, the first value is the value determined by the first device; and the receiving unit is further configured to receive the first value sent by the first device.

With reference to any one of the fourth aspect to the fourth possible implementation of the fourth aspect, in a fifth possible implementation of the fourth aspect, the first time resource is a frame, a subframe, or a timeslot; and the second time resource is a frame, a subframe, or a timeslot.

With reference to any one of the fourth aspect to the fifth possible implementation of the fourth aspect, in a sixth possible implementation of the fourth aspect, the first time resource is a first subframe, where the first subframe includes N orthogonal frequency division multiplexing OFDM symbols, the N OFDM symbols are first N OFDM symbols of M OFDM symbols included in one complete subframe, M and N are positive integers, and M≥N.

With reference to any one of the fourth aspect to the fifth possible implementation of the fourth aspect, in a seventh possible implementation of the fourth aspect, the first time resource is a first timeslot, where the first timeslot belongs to a first subframe, and the first subframe includes N OFDM symbols; when N is greater than M/2, the first timeslot includes first N−M/2 OFDM symbols of the N OFDM symbols; M is a quantity of OFDM symbols included in one complete subframe, M and N are positive integers, and M≥N.

According to a fifth aspect, a first device is provided, including a processor, a memory, a bus, and a transmitter, where the processor, the memory, and the transmitter are interconnected by using the bus, where the processor is configured to scramble, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; and the transmitter is configured to send first data scrambled by the processor to the second device.

With reference to the fifth aspect, in a first possible implementation of the fifth aspect, a time domain resource of the second time resource includes a time domain resource of the first time resource.

With reference to the first possible implementation of the fifth aspect, in a second possible implementation of the fifth aspect, the time domain resource of the second time resource is the same as that of the first time resource.

With reference to the fifth aspect, in a third possible implementation of the fifth aspect, the first value is a preset value, a value determined by the first device, or a value determined by a third party.

With reference to the third possible implementation of the fifth aspect, in a fourth possible implementation of the fifth aspect, the first value is the value determined by the first device; and the transmitter is further configured to send the first value to the second device.

With reference to any one of the fifth aspect to the fourth possible implementation of the fifth aspect, in a fifth possible implementation of the fifth aspect, the first time resource is a frame, a subframe, or a timeslot; and the second time resource is a frame, a subframe, or a timeslot.

With reference to any one of the fifth aspect to the fifth possible implementation of the fifth aspect, in a sixth possible implementation of the fifth aspect, the first time resource is a first subframe, where the first subframe includes N orthogonal frequency division multiplexing OFDM symbols, the N OFDM symbols are first N OFDM symbols of M OFDM symbols included in one complete subframe, M and N are positive integers, and M≥N.

With reference to any one of the fifth aspect to the fifth possible implementation of the fifth aspect, in a seventh possible implementation of the fifth aspect, the first time resource is a first timeslot, where the first timeslot belongs to a first subframe, and the first subframe includes N OFDM symbols; when N is greater than M/2, the first timeslot includes first N−M/2 OFDM symbols of the N OFDM symbols; M is a quantity of OFDM symbols included in one complete subframe, M and N are positive integers, and M≥N.

According to a sixth aspect, a second device is provided, including a processor, a memory, a bus, and a receiver, where the processor, the memory, and the receiver are interconnected by using the bus, where the receiver is configured to receive scrambled first data sent by a first device; and the processor is configured to descramble, according to a first scrambling code sequence, the first data received by the receiver, where the first data is carried on a first time resource on an unlicensed carrier, and the first scrambling code sequence is generated according to a sequence number of a second time resource on a licensed carrier or a first value.

With reference to the sixth aspect, in a first possible implementation of the sixth aspect, a time domain resource of the second time resource includes a time domain resource of the first time resource.

With reference to the first possible implementation of the sixth aspect, in a second possible implementation of the sixth aspect, the time domain resource of the second time resource is the same as that of the first time resource.

With reference to the sixth aspect, in a third possible implementation of the sixth aspect, the first value is a preset value, a value determined by the first device, or a value determined by a third party.

With reference to the third possible implementation of the sixth aspect, in a fourth possible implementation of the sixth aspect, the first value is the value determined by the first device; and the receiver is further configured to receive the first value sent by the first device.

With reference to any one of the sixth aspect to the fourth possible implementation of the sixth aspect, in a fifth possible implementation of the sixth aspect, the first time resource is a frame, a subframe, or a timeslot; and the second time resource is a frame, a subframe, or a timeslot.

With reference to any one of the sixth aspect to the fifth possible implementation of the sixth aspect, in a sixth possible implementation of the sixth aspect, the first time resource is a first subframe, where the first subframe includes N orthogonal frequency division multiplexing OFDM symbols, the N OFDM symbols are first N OFDM symbols of M OFDM symbols included in one complete subframe, M and N are positive integers, and M≥N.

With reference to any one of the sixth aspect to the fifth possible implementation of the sixth aspect, in a seventh possible implementation of the sixth aspect, the first time resource is a first timeslot, where the first timeslot belongs to a first subframe, and the first subframe includes N OFDM symbols; when N is greater than M/2, the first timeslot includes first N−M/2 OFDM symbols of the N OFDM symbols; M is a quantity of OFDM symbols included in one complete subframe, M and N are positive integers, and M≥N.

According to a seventh aspect, a wireless communications system is provided, including a first device and a second device, where the first device is the first device according to the third aspect or any one of possible implementations of the first aspect, and the second device is the second device according to the fourth aspect or any one of possible implementations of the fourth aspect; or the first device is the first device according to the fifth aspect or any one of possible implementations of the fifth aspect, and the second device is the second device according to the sixth aspect or any one of possible implementations of the sixth aspect.

In the information transmission method, the device, and the system provided in the embodiments of the present disclosure, a first device scrambles, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; the first device sends scrambled first data to the second device. Therefore, a prior-art problem is resolved that when an unlicensed spectrum is preempted to send data, a receive end cannot obtain a correct sequence number, and cannot descramble information.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), and a Worldwide Interoperability for Microwave Access (WiMAX) communications system.

It should be understood that in the embodiments of the present disclosure, user equipment (UE) includes but is not limited to a mobile station (MS), a mobile terminal, a mobile telephone, a handset, a portable device (portable equipment), and the like. The user equipment may communicate with one or more core networks by using a radio access network (RAN). For example, the user equipment may be a mobile telephone (or referred to as a "cellular" phone), a computer having a wireless communication function, or the like; or the user equipment may further be a portable, pocket-sized, handheld, computer built-in, or in-vehicle mobile apparatus.

In the embodiments of the present disclosure, a device may further be a base station (Base Transceiver Station or BTS) in GSM or CDMA, or may be a base station (NodeB) in WCDMA, or may be an evolved NodeB (eNB or e-NodeB) in LTE, and this is not limited in the present disclosure.

It should be understood that, in the embodiments of the present disclosure, "first" and "second" are used merely for differentiation, and are not used as a limitation in the embodiments of the present disclosure.

Figure 1:
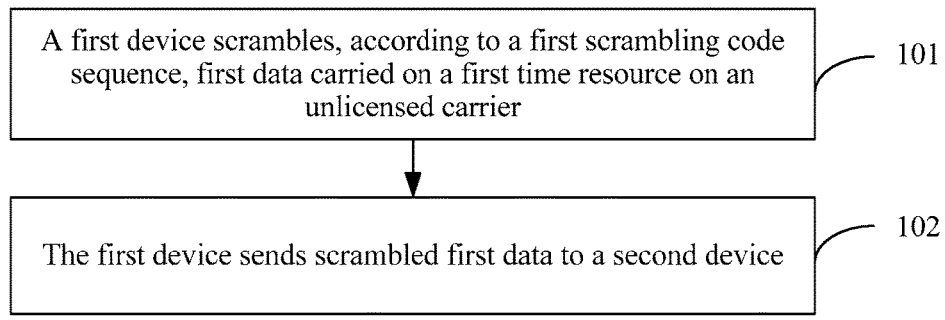
FIG. 1 is a schematic flowchart of an information transmission method according to an embodiment of the present disclosure.

An embodiment of the present disclosure provides an information transmission method. Preferably, the method is applied to an LTE system. Certainly, the method may also be applied to another wireless network system. Referring to FIG. 1, the method includes the following steps.

101. A first device scrambles, according to a first scrambling code sequence, first data carried on a first time resource on an unlicensed carrier.

The first data is data that is sent by the first device to a second device, and the first scrambling code sequence is generated according to a sequence number of a second time resource on a licensed carrier or a first value. That is, a sequence number on the licensed carrier may accordingly serve as a sequence number on the unlicensed carrier. A correspondence between a time resource on the unlicensed carrier and a time resource on the licensed carrier may be defined according to a preset rule, and this is not limited in the present disclosure.

Optionally, the first time resource may be a frame, a subframe, or a timeslot. The second time resource may also be a frame, a subframe, or a timeslot.

Optionally, a time domain resource of the second time resource includes a time domain resource of the first time resource. In this case, preferably, the time domain resource of the second time resource is the same as that of the first time resource.

Figure 2:
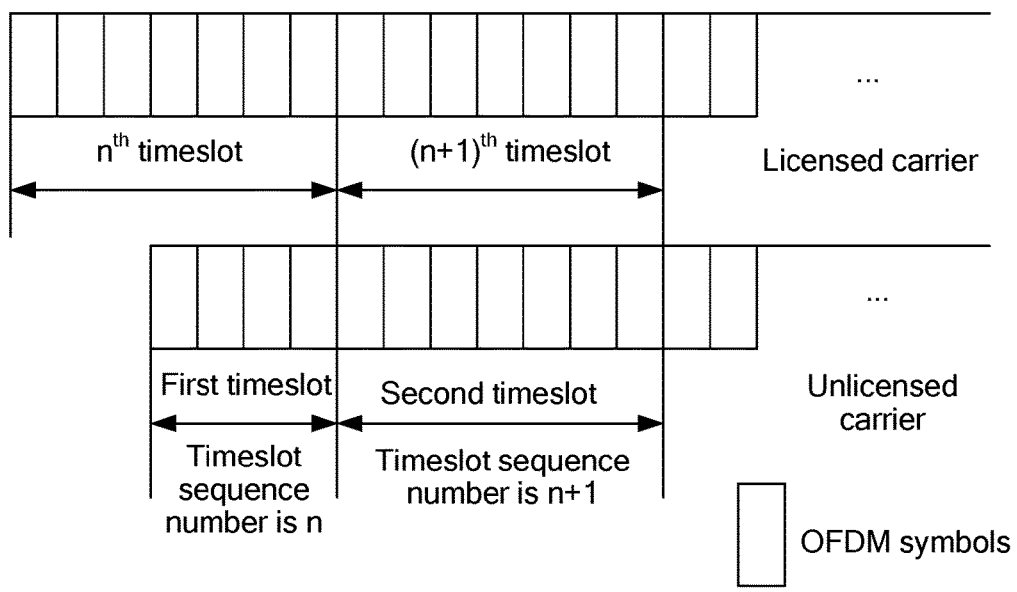
FIG. 2 is a schematic diagram of a time resource sequence number according to an embodiment of the present disclosure.

As shown in FIG. 2, in FIG. 2, a time resource whose sequence number is n on the licensed carrier and a first time resource on the unlicensed carrier include a same time domain resource, and n serves as a sequence number of the first time resource. A time resource whose sequence number is n+1 on the licensed carrier and a second time resource on the unlicensed carrier include a same time domain resource, and n+1 serves as a sequence number of the second time resource, and so on.

In addition, optionally, the first value may be a preset value, or may be a value determined by the first device or a value determined by a third party. The first value may be a fixed value, or a value varied according to a preset algorithm. Further and optionally, when the first value is the value determined by the first device, the first device sends the first value to the second device, so that the second device obtains the first scrambling code sequence to descramble the first data carried on the first time resource. Preferably, the first value may be a cell identity, or the first value may be a variable generated according to a cell identity or a fixed value. Certainly, the first value may also be the preset value, and does not need to be sent to the second device.

Optionally, a scenario in which an unlicensed spectrum is preempted is applied. When preempting the unlicensed spectrum, the first device sends data by using a resource on the unlicensed carrier. In this case, that the first time resource is a first subframe is used as an example for description. The first subframe includes N OFDM (orthogonal frequency division multiplexing) symbols. When the N OFDM symbols are first N OFDM symbols of M OFDM symbols included in one complete subframe, that is, when the first subframe is not one complete subframe, OFDM symbols in one complete subframe are scheduled from front to back. M and N are positive integers, and M≥N. Preferably, M is 12 or 14.

Figure 3:
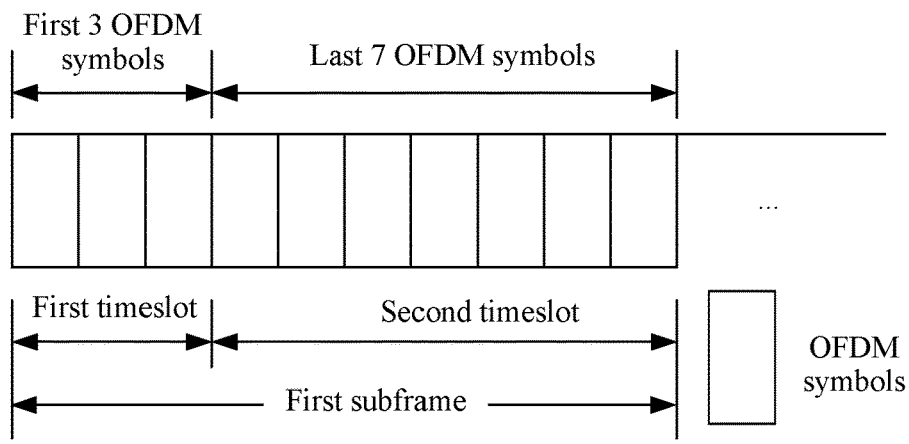
FIG. 3 is a schematic structural diagram of a time resource according to an embodiment of the present disclosure.

Alternatively, optionally, the first time resource is a first timeslot. The first timeslot belongs to a first subframe, and the first subframe includes N OFDM symbols. When N is greater than M/2, the first timeslot includes first N−M/2 OFDM symbols of the N OFDM symbols. M is a quantity of OFDM symbols included in one complete subframe. M and N are positive integers, and M≥N. Because one subframe includes two time resources, when the first subframe includes N OFDM symbols, if M is 14, when N is greater than 7, first (N−7) OFDM symbols of the N OFDM symbols correspond to the first value, that is, the first (N−7) OFDM symbols of the N OFDM symbols serve as a first time resource, and last 7 OFDM symbols of the N OFDM symbols correspond to a second sequence number, that is, the last 7 OFDM symbols serve as a second time resource; if M is 12, when N is greater than 6, first (N−6) OFDM symbols of the N OFDM symbols correspond to the first value, and last 6 OFDM symbols of the N OFDM symbols correspond to a second sequence number. As shown in FIG. 3, that N is 10 and M is 14 is used as an example in FIG. 3. First 3 OFDM symbols serve as a first time resource, and last 7 OFDM symbols serve as a second time resource.

102. The first device sends scrambled first data to the second device.

Optionally, the first device may be a base station, and the second device may be user equipment. Certainly, descriptions herein are merely an example, and this does not represent that the present disclosure is limited thereto.

In the information transmission method provided in this embodiment of the present disclosure, a first device scrambles, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; the first device sends scrambled first data to the second device. Therefore, a prior-art problem is resolved that when an unlicensed spectrum is preempted to send data, a receive end cannot obtain a correct sequence number, and cannot descramble information.

Figure 4:
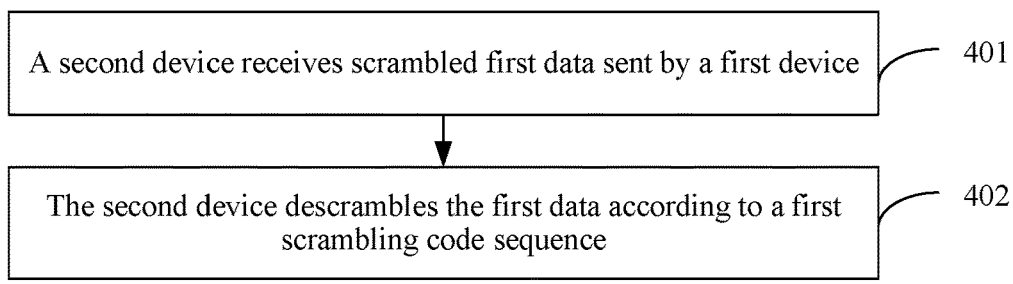
FIG. 4 is a schematic flowchart of an information transmission method according to another embodiment of the present disclosure.

With reference to the foregoing embodiments corresponding to FIG. 1, another embodiment of the present disclosure provides an information transmission method. The method is a method of a receive end in the embodiments corresponding to FIG. 1. Referring to FIG. 4, the method includes the following steps.

401. A second device receives scrambled first data sent by a first device.

Optionally, the first device may be a base station, and the second device may be user equipment. Certainly, descriptions herein are merely an example, and this does not represent that the present disclosure is limited thereto.

402. The second device descrambles the first data according to a first scrambling code sequence.

The first data is carried on a first time resource on an unlicensed carrier, and the first scrambling code sequence is generated according to a sequence number of a second time resource on a licensed carrier or a first value. That is, a sequence number on the licensed carrier may accordingly serve as a sequence number on the unlicensed carrier. A correspondence between a time resource on the unlicensed carrier and a time resource on the licensed carrier may be defined according to a preset rule, and this is not limited in the present disclosure.

Optionally, the first time resource may be a frame, a subframe, or a timeslot. The second time resource may also be a frame, a subframe, or a timeslot.

Optionally, a time domain resource of the second time resource includes a time domain resource of the first time resource. In this case, preferably, the time domain resource of the second time resource is the same as that of the first time resource.

In addition, optionally, the first value may be a preset value, or may be a value determined by the first device or a value determined by a third party. The first value may be a fixed value, or a value varied according to a preset algorithm. Further and optionally, when the first value is the value determined by the first device, the second device receives the first value sent by the first device, to obtain the first scrambling code sequence to descramble the first data carried on the first time resource. Preferably, the first value may be a cell identity, or the first value may be a variable generated according to a cell identity or a fixed value. Certainly, the first value may also be the preset value, and does not need to be sent to the second device.

Optionally, a scenario in which an unlicensed spectrum is preempted is applied. When preempting the unlicensed spectrum, the first device sends data by using a resource on the unlicensed carrier. In this case, that the first time resource is a first subframe is used as an example for description. The first subframe includes N OFDM (orthogonal frequency division multiplexing) symbols. When the N OFDM symbols are first N OFDM symbols of M OFDM symbols included in one complete subframe, that is, when the first subframe is not one complete subframe, OFDM symbols in one complete subframe are scheduled from front to back. M and N are positive integers, and M≥N. Preferably, M is 12 or 14.

Alternatively, optionally, the first time resource is a first timeslot. The first timeslot belongs to a first subframe, and the first subframe includes N OFDM symbols. When N is greater than M/2, the first timeslot includes first N−M/2 OFDM symbols of the N OFDM symbols. M is a quantity of OFDM symbols included in one complete subframe. M and N are positive integers, and M≥N. Because one subframe includes two time resources, when the first subframe includes N OFDM symbols, if M is 14, when N is greater than 7, first (N−7) OFDM symbols of the N OFDM symbols correspond to the first value, that is, the first (N−7) OFDM symbols of the N OFDM symbols serve as a first time resource, and last 7 OFDM symbols of the N OFDM symbols correspond to a second sequence number, that is, the last 7 OFDM symbols serve as a second time resource; if M is 12, when N is greater than 6, first (N−6) OFDM symbols of the N OFDM symbols correspond to the first value, and last 6 OFDM symbols of the N OFDM symbols correspond to a second sequence number. As shown in FIG. 3, that N is 10 and M is 14 is used as an example in FIG. 3. First 3 OFDM symbols serve as a first time resource, and last 7 OFDM symbols serve as a second time resource.

In the information transmission method provided in this embodiment of the present disclosure, a second device receives scrambled first data sent by a first device, and the second device descrambles the first data according to a first scrambling code sequence. The first data is carried on a first time resource on an unlicensed carrier, and the first scrambling code sequence is generated according to a sequence number of a second time resource on a licensed carrier or a first value. Therefore, a prior-art problem is resolved that when an unlicensed spectrum is preempted to send data, a receive end cannot obtain a correct sequence number, and cannot descramble information.

Figure 5:
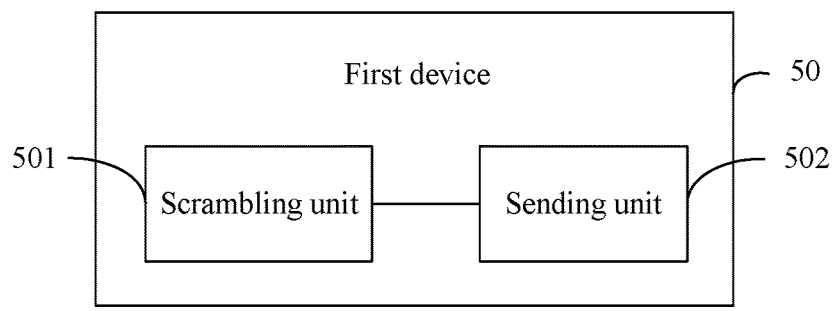
FIG. 5 is a schematic structural diagram of a first device according to an embodiment of the present disclosure.

Based on the foregoing embodiments corresponding to FIG. 1, an embodiment of the present disclosure provides a first device, configured to execute the information transmission method described in the foregoing embodiments corresponding to FIG. 1. Referring to FIG. 5, the first device 50 includes a scrambling unit 501 and a sending unit 502.

The scrambling unit 501 is configured to scramble, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value.

The sending unit 502 is configured to send first data scrambled by the scrambling unit 501 to the second device.

Optionally, a time domain resource of the second time resource includes a time domain resource of the first time resource. Further and optionally, the time domain resource of the second time resource is the same as that of the first time resource.

Optionally, the first value is a preset value, a value determined by the first device, or a value determined by a third party.

Further and optionally, if the first value is the value determined by the first device, the sending unit 502 is further configured to send the first value to the second device.

Optionally, the first time resource may be a frame, a subframe, or a timeslot; the second time resource may also be a frame, a subframe, or a timeslot.

Optionally, in an application scenario, the first time resource is a first subframe. The first subframe includes N orthogonal frequency division multiplexing OFDM symbols, and the N OFDM symbols are first N OFDM symbols of M OFDM symbols included in one complete subframe. M and N are positive integers, and M≥N.

Alternatively, optionally, in another application scenario, the first time resource is a first timeslot. The first timeslot belongs to a first subframe, and the first subframe includes N OFDM symbols. When N is greater than M/2, the first timeslot includes first N−M/2 OFDM symbols of the N OFDM symbols. M is a quantity of OFDM symbols included in one complete subframe. M and N are positive integers, and M≥N.

The first device provided in this embodiment of the present disclosure scrambles, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; the first device sends scrambled first data to the second device. Therefore, a prior-art problem is resolved that when an unlicensed spectrum is preempted to send data, a receive end cannot obtain a correct sequence number, and cannot descramble information.

Figure 6:
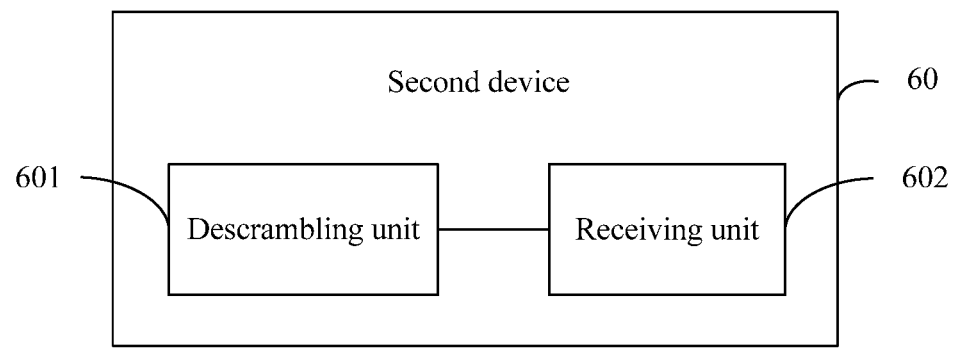
FIG. 6 is a schematic structural diagram of a second device according to an embodiment of the present disclosure.

Based on the foregoing embodiments corresponding to FIG. 4, an embodiment of the present disclosure provides a second device, configured to execute the information transmission method described in the foregoing embodiments corresponding to FIG. 4. Referring to FIG. 6, the first device 60 includes a descrambling unit 601 and a receiving unit 602.

The receiving unit 602 is configured to receive scrambled first data sent by a first device.

The descrambling unit 601 is configured to descramble, according to a first scrambling code sequence, the first data received by the receiving unit 601, where the first data is carried on a first time resource on an unlicensed carrier, and the first scrambling code sequence is generated according to a sequence number of a second time resource on a licensed carrier or a first value.

Optionally, a time domain resource of the second time resource includes a time domain resource of the first time resource. Further and optionally, the time domain resource of the second time resource is the same as that of the first time resource.

Optionally, the first value is a preset value, a value determined by the first device, or a value determined by a third party.

Further and optionally, if the first value is the value determined by the first device, the receiving unit 601 is further configured to receive the first value sent by the first device.

Optionally, the first time resource may be a frame, a subframe, or a timeslot; the second time resource may also be a frame, a subframe, or a timeslot.

Optionally, in an application scenario, the first time resource is a first subframe. The first subframe includes N orthogonal frequency division multiplexing OFDM symbols, and the N OFDM symbols are first N OFDM symbols of M OFDM symbols included in one complete subframe. M and N are positive integers, and M≥N.

Alternatively, optionally, in another application scenario, the first time resource is a first timeslot. The first timeslot belongs to a first subframe, and the first subframe includes N OFDM symbols. When N is greater than M/2, the first timeslot includes first N−M/2 OFDM symbols of the N OFDM symbols. M is a quantity of OFDM symbols included in one complete subframe. M and N are positive integers, and M≥N.

The second device provided in this embodiment of the present disclosure receives scrambled first data sent by a first device, and the second device descrambles the first data according to a first scrambling code sequence. The first data is carried on a first time resource on an unlicensed carrier, and the first scrambling code sequence is generated according to a sequence number of a second time resource on a licensed carrier or a first value. Therefore, a prior-art problem is resolved that when an unlicensed spectrum is preempted to send data, a receive end cannot obtain a correct sequence number, and cannot descramble information.

Figure 7:
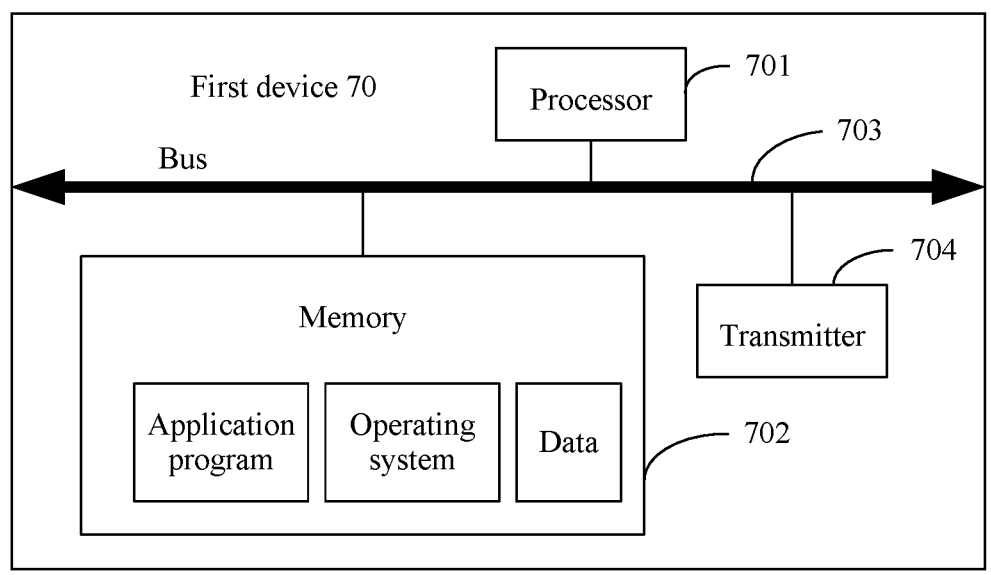
FIG. 7 is a schematic structural diagram of a first device according to another embodiment of the present disclosure.

Based on the foregoing embodiments corresponding to FIG. 1, another embodiment of the present disclosure provides a first device, configured to execute the information transmission method described in the foregoing embodiments corresponding to FIG. 1. Referring to FIG. 7, the first device 70 includes at least one processor 701, a memory 702, a bus 703, and a transmitter 704. The at least one processor 701, the memory 702, and the transmitter 704 are connected to and communicate with each other by using the bus 703.

The bus 703 may be an ISA (industry standard architecture) bus, a PCI (peripheral component interconnect) bus, an EISA (extended industry standard architecture) bus, or the like. The bus 703 may be categorized into an address bus, a data bus, a control bus, and the like. For ease of illustration, only one bold line is used in FIG. 7 to represent the bus, which, however, does not mean there is only one bus or only one type of bus.

The memory 702 is configured to store application program code that executes the solutions of the present disclosure. The application program code that executes the solutions of the present disclosure is saved in the memory, and execution thereof is controlled by the processor 701.

The memory may be a read-only memory ROM or a static storage device of another type that may store static information and instructions, or a random access memory RAM or a dynamic storage device of another type that may store information and instructions; or may be an electrically erasable programmable read-only memory EEPROM, a compact disc read-only memory CD-ROM or other compact disc storage, optical disc storage (including a compact disc, a laser disc, an optical disc, a digital versatile disc, and a Blu-ray disc, and the like), a disk storage medium or another magnetic storage device, or any other medium that can be used to carry or store expected program code in an instruction or data structure form and can be accessed by a computer, which, however, is not limited herein. The memories are connected to the processor by using the bus.

The processor 701 may be a central processing unit (CPU) 701, or an application-specific integrated circuit (ASIC), or one or more integrated circuits configured to implement this embodiment of the present disclosure.

The processor 701 is configured to invoke the program code in the memory 702. In a possible implementation, when the foregoing application program is executed by the processor 701, the following functions are implemented:

The processor 701 is configured to scramble, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value.

The transmitter 704 is configured to send first data scrambled by the processor 701 to the second device.

Optionally, a time domain resource of the second time resource includes a time domain resource of the first time resource. Further and optionally, the time domain resource of the second time resource is the same as that of the first time resource.

Optionally, the first value is a preset value, a value determined by the first device, or a value determined by a third party.

Further and optionally, if the first value is the value determined by the first device, the transmitter 704 is further configured to send the first value to the second device.

Optionally, the first time resource may be a frame, a subframe, or a timeslot; the second time resource may also be a frame, a subframe, or a timeslot.

Optionally, in an application scenario, the first time resource is a first subframe. The first subframe includes N orthogonal frequency division multiplexing OFDM symbols, and the N OFDM symbols are first N OFDM symbols of M OFDM symbols included in one complete subframe. M and N are positive integers, and M≥N.

Alternatively, optionally, in another application scenario, the first time resource is a first timeslot. The first timeslot belongs to a first subframe, and the first subframe includes N OFDM symbols. When N is greater than M/2, the first timeslot includes first N−M/2 OFDM symbols of the N OFDM symbols. M is a quantity of OFDM symbols included in one complete subframe. M and N are positive integers, and M≥N.

The first device provided in this embodiment of the present disclosure scrambles, according to a first scrambling code sequence, first data carried on a first time resource on an unlicensed carrier, where the first data is data that is sent by the first device to a second device, and the first scrambling code sequence is generated according to a sequence number of a second time resource on a licensed carrier or a first value; the first device sends scrambled first data to the second device. Therefore, a prior-art problem is resolved that when an unlicensed spectrum is preempted to send data, a receive end cannot obtain a correct sequence number, and cannot descramble information.

Figure 8:
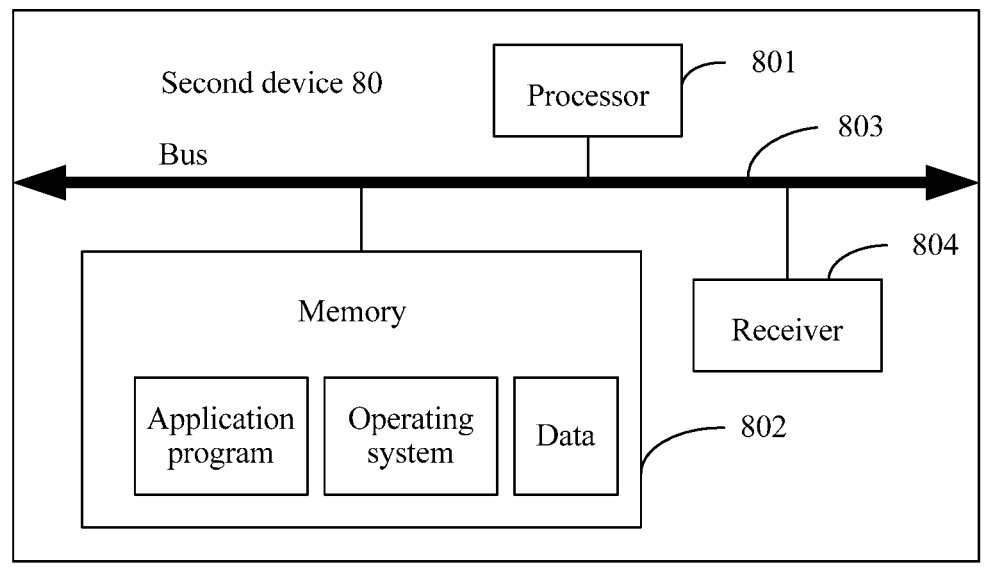
FIG. 8 is a schematic structural diagram of a second device according to another embodiment of the present disclosure.

Based on the foregoing embodiments corresponding to FIG. 4, an embodiment of the present disclosure provides a second device, configured to execute the information transmission method described in the foregoing embodiments corresponding to FIG. 4. Referring to FIG. 8, the second device 80 includes at least one processor 801, a memory 802, a bus 803, and a receiver 804. The at least one processor 801, the memory 802, and the receiver 804 are connected to and communicate with each other by using the bus 803.

The bus 803 may be an ISA (industry standard architecture) bus, a PCI (peripheral component interconnect) bus, an EISA (extended industry standard architecture) bus, or the like. The bus 803 may be categorized into an address bus, a data bus, a control bus, and the like. For ease of illustration, only one bold line is used in FIG. 8 to represent the bus, which, however, does not mean there is only one bus or only one type of bus.

The memory 802 is configured to store application program code that executes the solutions of the present disclosure. The application program code that executes the solutions of the present disclosure is saved in the memory, and execution thereof is controlled by the processor 801.

The memory may be a read-only memory ROM or a static storage device of another type that may store static information and instructions, or a random access memory RAM or a dynamic storage device of another type that may store information and instructions; or may be an electrically erasable programmable read-only memory EEPROM, a compact disc read-only memory CD-ROM or other compact disc storage, optical disc storage (including a compact disc, a laser disc, an optical disc, a digital versatile disc, and a Blu-ray disc, and the like), a disk storage medium or another magnetic storage device, or any other medium that can be used to carry or store expected program code in an instruction or data structure form and can be accessed by a computer, which, however, is not limited herein. The memories are connected to the processor by using the bus.

The processor 801 may be a central processing unit (CPU) 801, or an application-specific integrated circuit (ASIC), or one or more integrated circuits configured to implement this embodiment of the present disclosure.

The processor 801 is configured to invoke the program code in the memory 802. In a possible implementation, when the foregoing application program is executed by the processor 801, the following functions are implemented.

The receiver 804 is configured to receive scrambled first data sent by a first device.

The processor 801 is configured to descramble, according to a first scrambling code sequence, the first data received by the receiving unit 801, where the first data is carried on a first time resource on an unlicensed carrier, and the first scrambling code sequence is generated according to a sequence number of a second time resource on a licensed carrier or a first value.

Optionally, a time domain resource of the second time resource includes a time domain resource of the first time resource. Further and optionally, the time domain resource of the second time resource is the same as that of the first time resource.

Optionally, the first value is a preset value, a value determined by the first device, or a value determined by a third party.

Further and optionally, if the first value is the value determined by the first device,
the receiving unit 801 is further configured to receive the first value sent by the first device.

Optionally, the first time resource may be a frame, a subframe, or a timeslot; the second time resource may also be a frame, a subframe, or a timeslot.

Optionally, in an application scenario, the first time resource is a first subframe. The first subframe includes N orthogonal frequency division multiplexing OFDM symbols, and the N OFDM symbols are first N OFDM symbols of M OFDM symbols included in one complete subframe. M and N are positive integers, and M≥N.

Alternatively, optionally, in another application scenario, the first time resource is a first timeslot. The first timeslot belongs to a first subframe, and the first subframe includes N OFDM symbols. When N is greater than M/2, the first timeslot includes first N−M/2 OFDM symbols of the N OFDM symbols. M is a quantity of OFDM symbols included in one complete subframe. M and N are positive integers, and M≥N.

The second device provided in this embodiment of the present disclosure receives scrambled first data sent by a first device, and the second device descrambles the first data according to a first scrambling code sequence. The first data is carried on a first time resource on an unlicensed carrier, and the first scrambling code sequence is generated according to a sequence number of a second time resource on a licensed carrier or a first value. Therefore, a prior-art problem is resolved that when an unlicensed spectrum is preempted to send data, a receive end cannot obtain a correct sequence number, and cannot descramble information.

Figure 9:
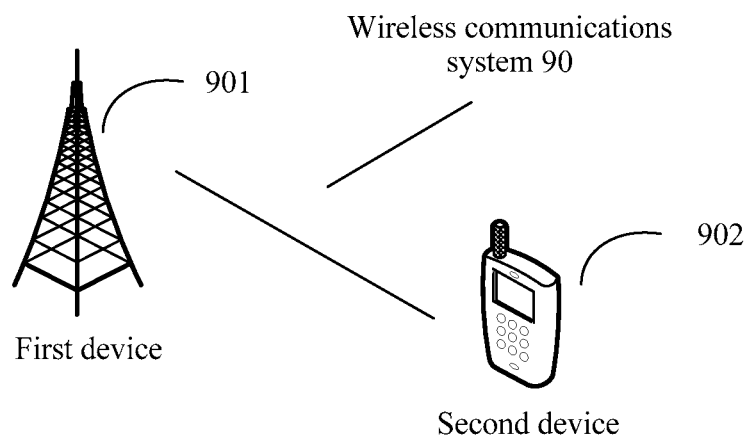
FIG. 9 is a schematic structural diagram of a wireless communications system according to an embodiment of the present disclosure.

Based on the foregoing embodiments corresponding to FIG. 1 and FIG. 4, an embodiment of the present disclosure provides a wireless communications system, configured to execute the information transmission method described in the foregoing embodiments corresponding to FIG. 1 and FIG. 4. Referring to FIG. 9, the wireless communications system 90 includes a first device 901 and a second device 902.

The first device 901 is the first device described in the embodiments corresponding to FIG. 5, and the second device 902 is the second device described in the embodiments corresponding to FIG. 6.

Alternatively, the first device 901 is the first device described in the embodiments corresponding to FIG. 7, and the second device 902 is the second device described in the embodiments corresponding to FIG. 8.

In the wireless communications system provided in this embodiment of the present disclosure, first data carried on a first time resource on an unlicensed carrier is scrambled according to a first scrambling code sequence, where the first data is data that is sent by a first device to a second device, and the first scrambling code sequence is generated according to a sequence number of a second time resource on a licensed carrier or a first value; the first device sends scrambled first data to the second device. Therefore, a prior-art problem is resolved that when an unlicensed spectrum is preempted to send data, a receive end cannot obtain a correct sequence number, and cannot descramble information.

In addition, a computer readable medium (or medium) is further provided, including a computer readable instruction that performs the following operations when the medium is executed: executing the operations of steps 101 and 102 or steps 401 and 402 in the method of the foregoing embodiments.

In addition, a computer program product is further provided, including the foregoing computer readable medium.

It should be noted that the signaling mentioned herein includes but is not limited to an indication, information, a signal, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited: The computer readable medium may include a RAM (random access memory), a ROM (read-only memory), an EEPROM (electrically erasable programmable read-only memory), a CD-ROM (compact disc read-only memory) or other optical disk storage, a disk storage medium or other disk storage, or any other medium that can be used to carry or store expected program code in an instruction or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present disclosure include a CD (compact disc), a laser disc, an optical disc, a DVD disc (digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method, comprising:
scrambling, by a first device according to a first scrambling code sequence, first data carried on a first time resource on an unlicensed carrier, wherein the first data is data that is sent by the first device to a second device, and the first scrambling code sequence is generated according to a sequence number of a second time resource on a licensed carrier or a first value; and
sending, by the first device, scrambled first data to the second device;
wherein the first time resource is a first timeslot, wherein the first timeslot belongs to a first subframe, and the first subframe comprises N orthogonal frequency division multiplexing (OFDM) symbols; when N is greater than M/2, the first timeslot comprises first N−M/2 OFDM symbols of the N OFDM symbols;
wherein M is a quantity of OFDM symbols comprised in one complete subframe, M and N are positive integers, and M≥N.

2. The method according to claim 1, wherein:
a time domain resource of the second time resource comprises a time domain resource of the first time resource.

3. The method according to claim 2, wherein:
the time domain resource of the second time resource is the same as that of the first time resource.

4. The method according to claim 1, wherein:
the first value is: a preset value, or a value determined by the first device, or a value determined by a third party.

5. The method according to claim 4, wherein the first value is the value determined by the first device, and the method further comprises:
sending, by the first device, the first value to the second device.

6. The method according to claim 1, wherein:
the second time resource is a frame, a subframe, or a timeslot.

7. An information transmission method, comprising:
receiving, by a second device, scrambled first data sent by a first device; and
descrambling, by the second device, the first data according to a first scrambling code sequence, wherein the first data is carried on a first time resource on an unlicensed carrier, and the first scrambling code sequence is generated according to a sequence number of a second time resource on a licensed carrier or a first value;
wherein the first time resource is a first timeslot, wherein the first timeslot belongs to a first subframe, and the first subframe comprises N orthogonal frequency division multiplexing (OFDM) symbols; when N is greater than M/2, the first timeslot comprises first N–M/2 OFDM symbols of the N OFDM symbols; M is a quantity of OFDM symbols comprised in one complete subframe;
wherein M and N are positive integers, and M≥N.

8. The method according to claim 7, wherein:
a time domain resource of the second time resource comprises a time domain resource of the first time resource.

9. The method according to claim 8, wherein:
the time domain resource of the second time resource is the same as that of the first time resource.

10. The method according to claim 7, wherein:
the first value is: a preset value, a value determined by the first device, or a value determined by a third party.

11. The method according to claim 10, wherein the first value is the value determined by the first device, and the method further comprises:
receiving, by the second device, the first value sent by the first device.

12. The method according to claim 7, wherein:
the second time resource is a frame, a subframe, or a timeslot.

13. A first device, comprising:
a processor configured to scramble, according to a first scrambling code sequence, first data carried on a first time resource on an unlicensed carrier, wherein the first data is data that is sent by the first device to a second device, and the first scrambling code sequence is generated according to a sequence number of a second time resource on a licensed carrier or a first value; and
a transmitter configured to send first data scrambled by the processor to the second device;
wherein the first time resource is a first timeslot, wherein the first timeslot belongs to a first subframe, and the first subframe comprises N orthogonal frequency division multiplexing (OFDM) symbols; when N is greater than M/2, the first timeslot comprises first N–M/2 OFDM symbols of the N OFDM symbols;
wherein M is a quantity of OFDM symbols comprised in one complete subframe, M and N are positive integers, and M≥N.

14. The first device according to claim 13, wherein the first value is a value determined by the first device; and
the transmitter is further configured to send the first value to the second device.

* * * * *